United States Patent
Namiki

(10) Patent No.: US 12,502,746 B2
(45) Date of Patent: Dec. 23, 2025

(54) MACHINE TOOL AND CONTROL METHOD AND CONTROL PROGRAM THEREOF

(71) Applicants: CITIZEN WATCH CO., LTD., Tokyo (JP); CITIZEN MACHINERY CO., LTD., Nagano (JP)

(72) Inventor: Tatsuya Namiki, Saitama (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 628 days.

(21) Appl. No.: 17/850,254

(22) Filed: Jun. 27, 2022

(65) Prior Publication Data

US 2023/0001530 A1 Jan. 5, 2023

Related U.S. Application Data

(60) Provisional application No. 63/215,799, filed on Jun. 28, 2021.

(51) Int. Cl.
*B23Q 15/12* (2006.01)

(52) U.S. Cl.
CPC .................... *B23Q 15/12* (2013.01)

(58) Field of Classification Search
CPC .................. B23Q 15/12; G05B 19/186; G05B 2219/45203
See application file for complete search history.

(56) References Cited

U.S. PATENT DOCUMENTS

| | | | | |
|---|---|---|---|---|
| 10,166,614 | B2 * | 1/2019 | Choi | B23D 21/00 |
| 10,877,456 | B2 * | 12/2020 | Kumazawa | B23G 1/34 |
| 11,176,291 | B2 * | 11/2021 | Mackman | G06F 30/20 |
| 11,517,967 | B2 * | 12/2022 | Kannwischer | B23B 27/1611 |
| 11,559,844 | B2 * | 1/2023 | Wagner | B23G 1/34 |
| 2004/0081519 | A1 * | 4/2004 | Gainer | B23G 5/18 |
| | | | | 409/74 |
| 2011/0150591 | A1 * | 6/2011 | Jansen | B23G 1/34 |
| | | | | 409/65 |
| 2015/0321269 | A1 * | 11/2015 | Malka | B23C 5/2239 |
| | | | | 407/44 |
| 2018/0318948 | A1 * | 11/2018 | Michiwaki | B23Q 15/007 |
| 2020/0238391 | A1 * | 7/2020 | Kannwischer | B23B 27/10 |

* cited by examiner

*Primary Examiner* — Alicia M. Choi
(74) *Attorney, Agent, or Firm* — IMAIZUMI IP LAW, PLLC; Toshikatsu Imaizumi

(57) ABSTRACT

A machine tool according to the disclosure has a spindle rotatably holding a cylindrical workpiece, a turret holding a thread whirling tool having a cutter ring having a base on which a through hole is formed and a plurality of types of cutting tools disposed on the inner diameter side of the base and having different shapes, so as to rotatably holds the cutter ring, a controller controlling rotations and relative movements of the spindle and the turret, wherein the controller has the spindle hold a workpiece, disposes the workpiece in the through hole so that the workpiece penetrates the through hole, rotates at least one of the cutter ring and the workpiece, and switches movements of the thread whirling tool in an extending direction of the workpiece and a direction intersecting with the extending direction thereof based on a selected predetermined cutting tool.

8 Claims, 14 Drawing Sheets

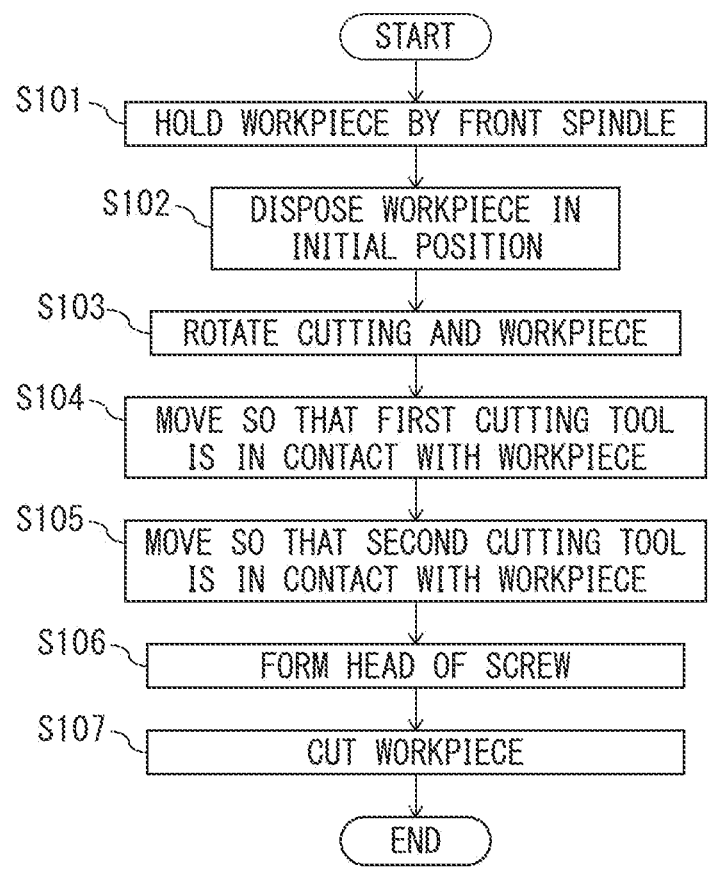

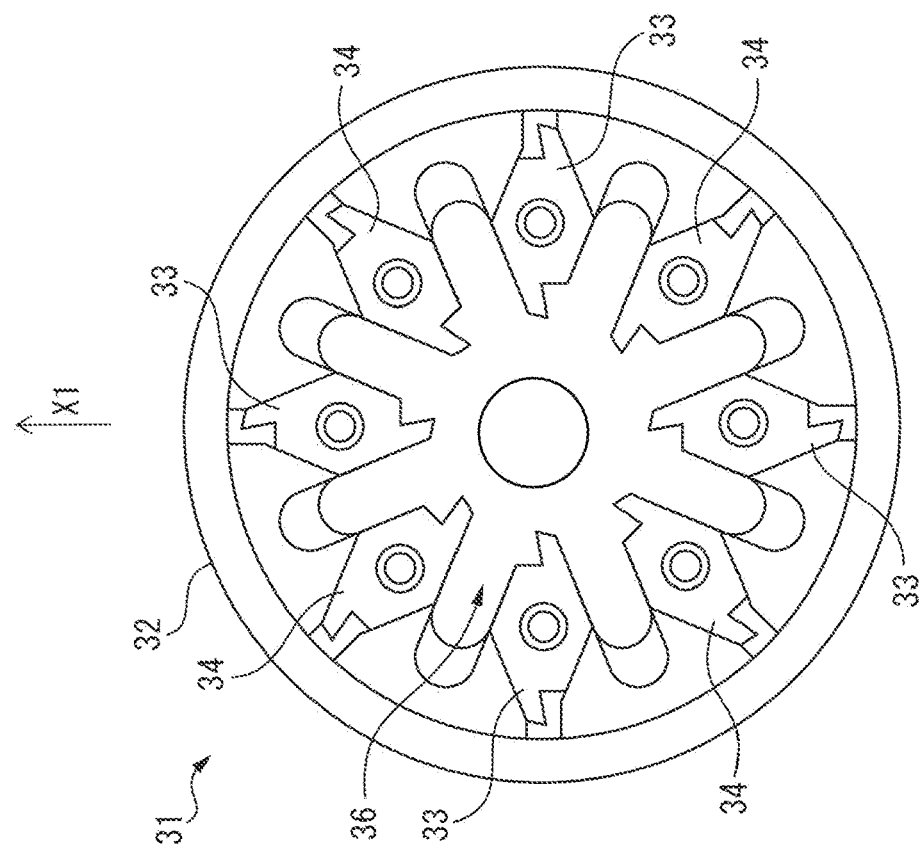
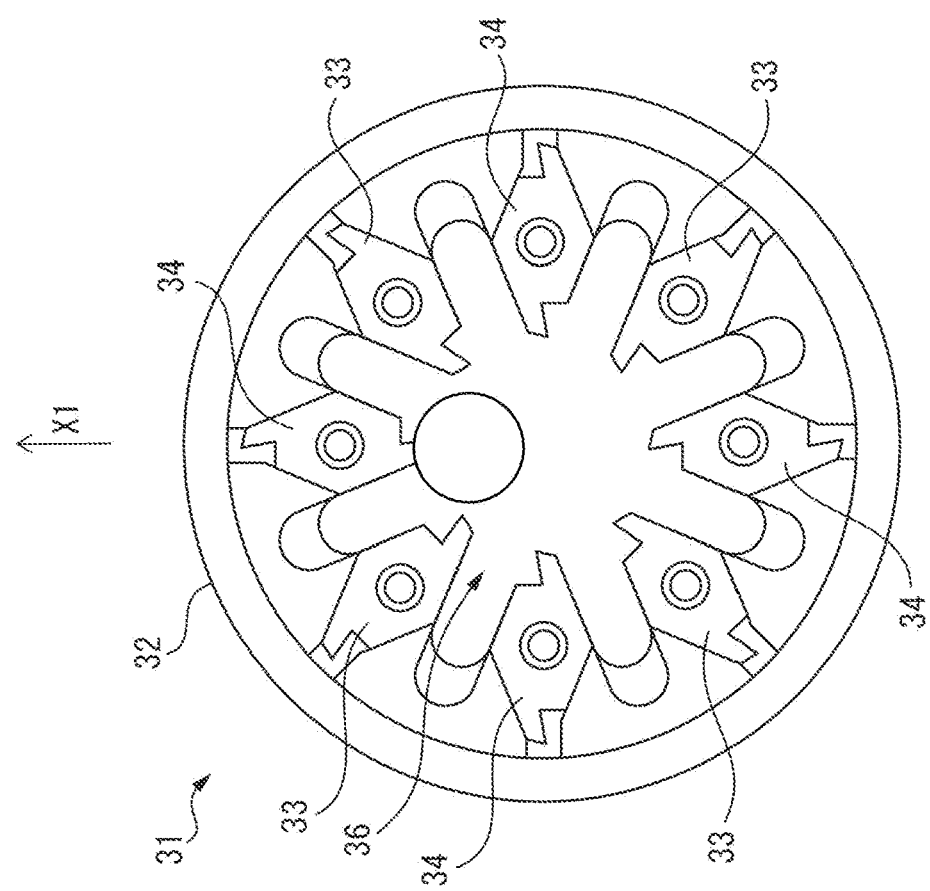

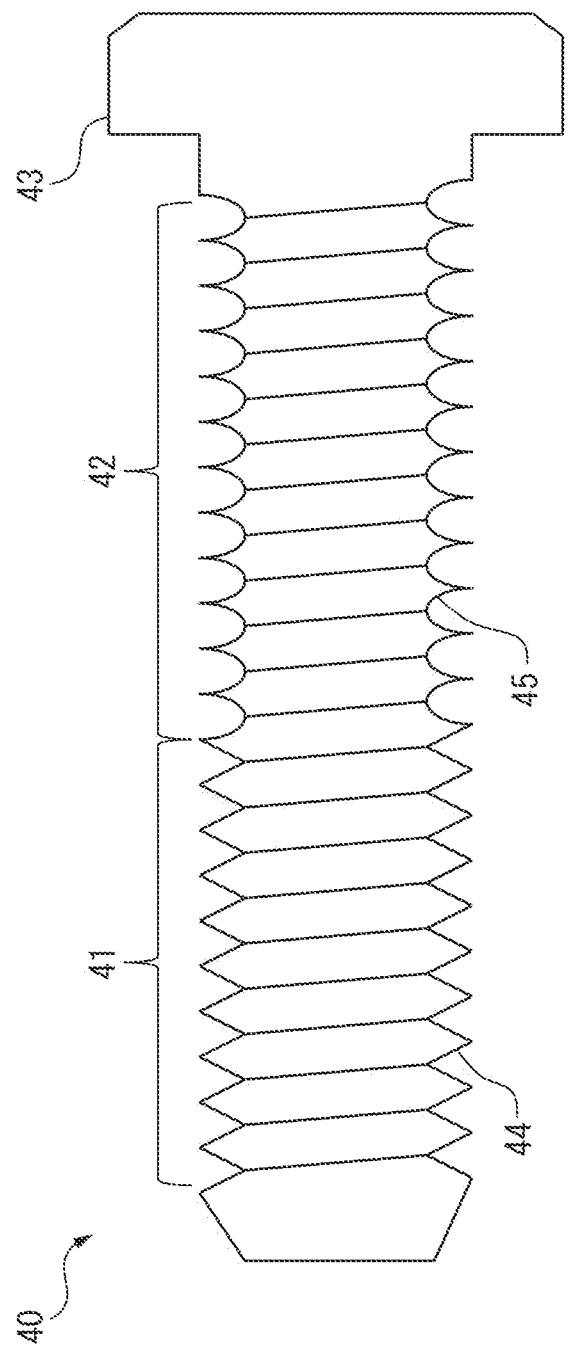

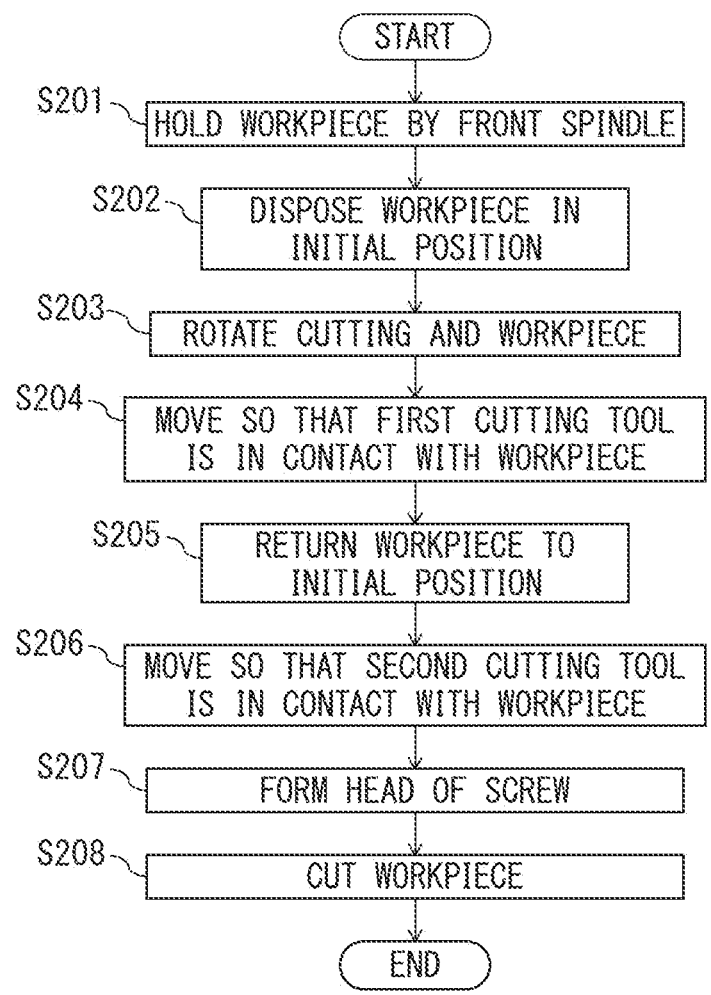

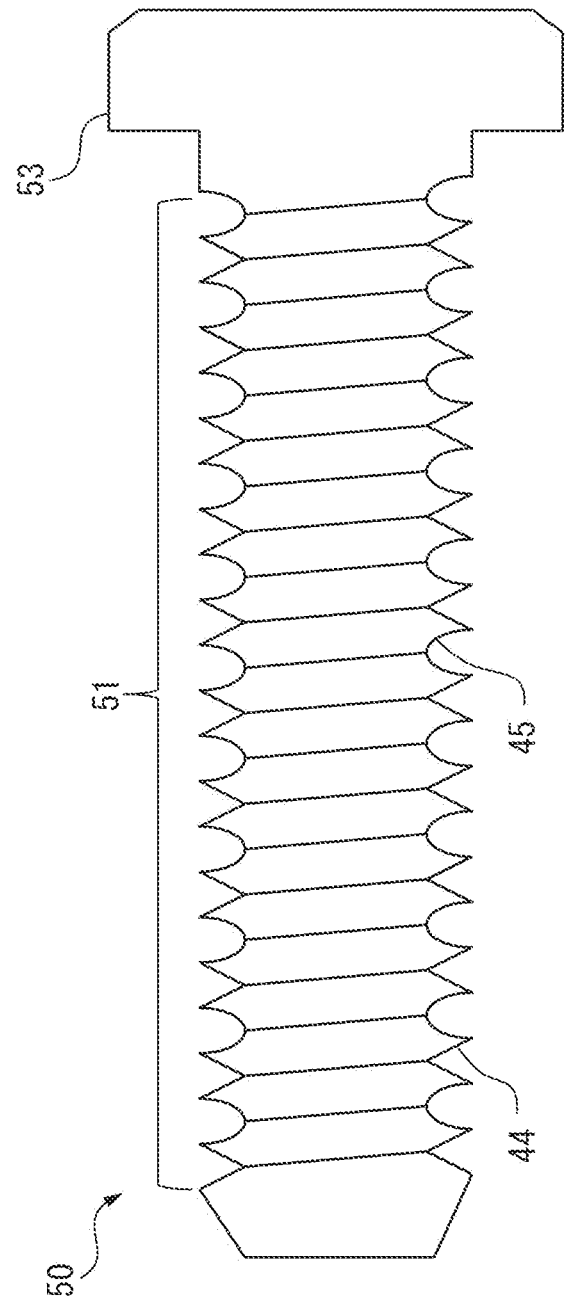

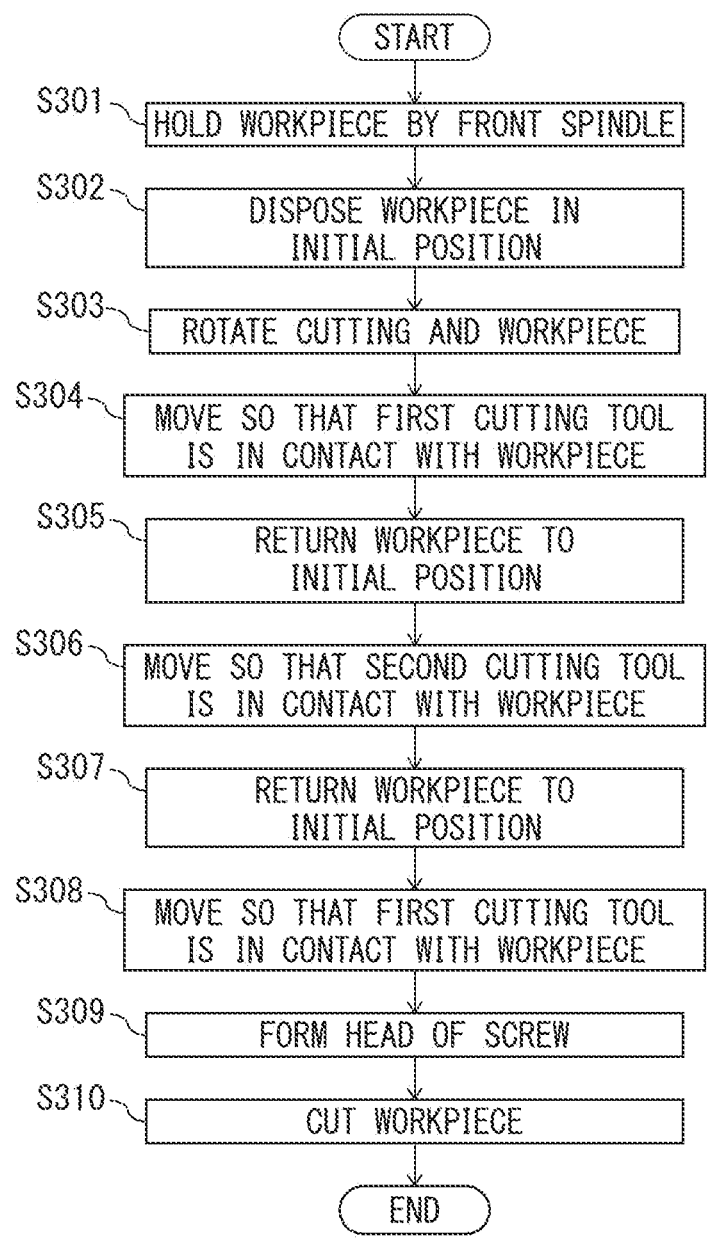

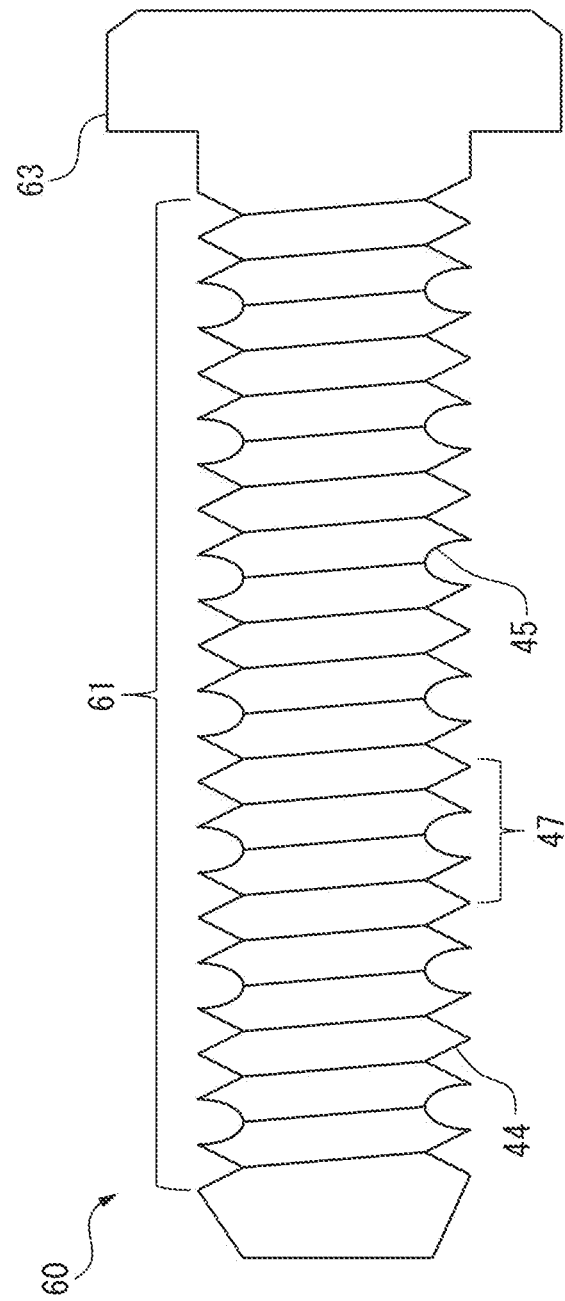

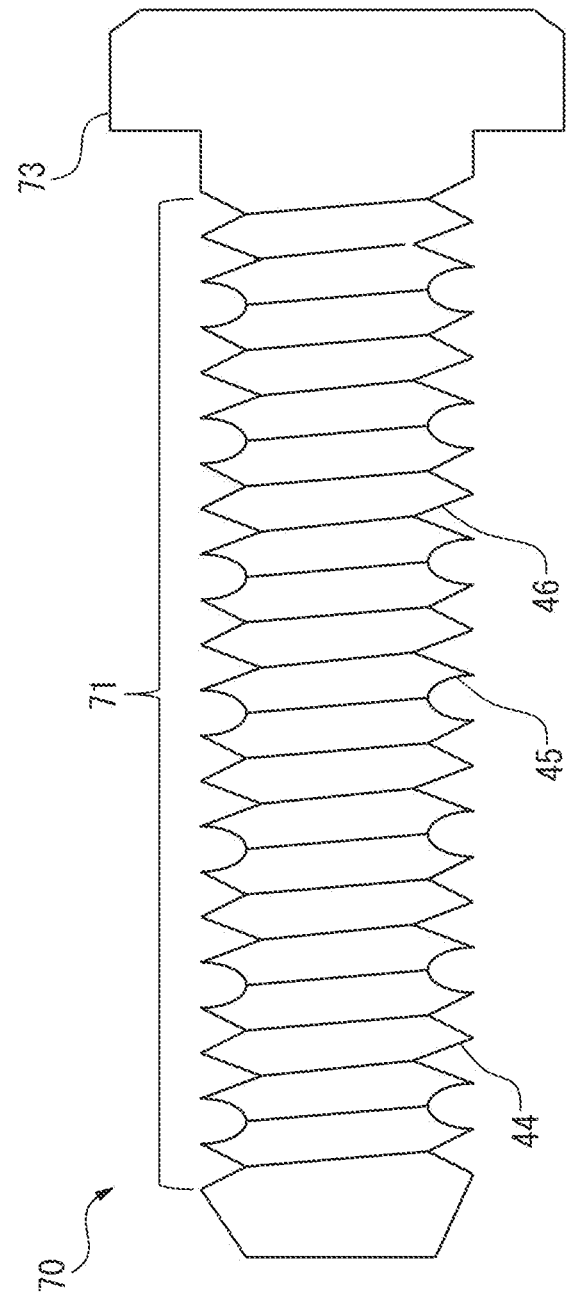

MACHINE TOOL AND CONTROL METHOD AND CONTROL PROGRAM THEREOF

CROSS-REFERENCE TO RELATED APPLICATION

This application is based upon and claims the benefit of priority of the prior U.S. Patent Application No. 63/215,799, filed on Jun. 28, 2021, the entire contents of which are incorporated herein by reference.

TECHNICAL FIELD

The present invention relates to a mechanical tool, a control method of a machine tool and a control program of a machine tool.

BACKGROUND

Various methods for forming screws in machine tools are known. For example, a machine tool is described in International Publication No. WO2019/171444 that shortens machining time for machining a screw, by performing the thread whirling process and turning process for forming an outer shape of a screw at the same time.

SUMMARY

Recently, a screw is desired that has a plurality of screw grooves having different shapes such as two-threaded screw or etc., in the medical screw such as a bone screw. Although a machine tool described therein may performs thread whirling and turning process at the same time, it is not easy to form a screw having a plurality of screw grooves having different shapes by using the machine tool.

An object of the present disclosure is to provide a machine tool that may form a screw having a plurality of screw grooves having different shapes.

A machine tool according to the disclosure has a spindle rotatably holding a cylindrical workpiece, a turret holding a whirling tool having a cutter ring having a base on which a through hole is formed and a plurality of types of cutting tools disposed on the inner diameter side of the base and having different shapes, so as to rotatably holds the cutter ring, a controller controlling rotations and relative movements of the spindle and the turret, wherein the controller has the spindle hold a workpiece, disposes the workpiece in the through hole so that the workpiece penetrates the through hole, rotates at least one of the cutter ring and the workpiece, and switches movements of the thread whirling tool in an extending direction of the workpiece and a direction intersecting with the extending direction thereof based on a selected predetermined cutting tool.

Further, in the machine tool, it is preferable that the cutting tools include a first cutting tools, and a second cutting tools having a shape different from that of the first cutting tools, and the controller moves the thread whirling tool in a direction crossing an extending direction of the workpiece during a first period for forming the first screw groove by cutting the workpiece by the first cutting tools, so that the first cutting tools are in contact with the workpiece, and moves the thread whirling tool in the direction crossing the extending direction of the workpiece during a second period for forming a second screw groove by cutting a workpiece by a second cutting tools, so that the second cutting tools are in contact with the workpiece.

Further, in the machine tool, it is preferable that the controller forms the first screw groove with a first lead having a length twice larger than the width of the first screw groove, and form the second screw groove through the first screw groove during the second period.

Further, in the machine tool, it is preferable that the controller forms the first screw groove with a second lead having a length three times larger than the width of the first screw groove during the first period, forms the second screw groove so that one end thereof is contacted with the first screw groove during the second period, and forms a third screw groove between the first screw groove and the second screw groove during a third period for forming the third screw groove by cutting the workpiece by the first cutting tools or the second cutting tools, by moving the thread whirling tool in the direction crossing the extending direction of the workpiece to, so that the first cutting tools or the second cutting tools are in contact with the workpiece.

Further, in the machine tool, it is preferable that the cutting tools further include a third cutting tools having a shape different from that of the first cutting tools and a second cutting tools, and the controller forms the first screw groove with a second lead having a length three times larger than the width of the first screw groove during the first period, forms the second screw groove so that one end thereof is contacted with the first screw groove during the second period ,and forms a third screw groove between the first screw groove and the second screw groove during the third period for forming the third screw groove by cutting the workpiece by third cutting tools, by moving the thread whirling tool in a direction crossing the extending direction of the workpiece during the third period for forming the third screw groove by cutting the workpiece by the third cutting tools, so that the third cutting tools are in contact with the workpiece.

A method for controlling a machine tool has a spindle rotatably holding a cylindrical workpiece, a turret holding a thread whirling tool having a cutter ring having a base on which a through hole is formed and a plurality of types of cutting tools disposed on the inner diameter side of the base and having different shapes, so as to rotatably holds the cutter ring, a controller controlling rotations and relative movements of the spindle and the turret, wherein the controller executes a process to have the spindle hold a workpiece, disposes the workpiece in the through hole so that the workpiece penetrates the through hole, rotate at least one of the cutter ring and the workpiece, and switch movements of the thread whirling tool in an extending direction of the workpiece and a direction intersecting with the extending direction thereof based on a selected predetermined cutting tool.

A computer program for controlling a machine tool has a spindle rotatably holding a cylindrical workpiece, a turret holding a thread whirling tool having a cutter ring having a base on which a through hole is formed and a plurality of types of cutting tools disposed on the inner diameter side of the base and having different shapes, so as to rotatably holds the cutter ring, a controller controlling rotations and relative movements of the spindle and the turret, wherein the controller executes a process to have the spindle hold a workpiece, disposes the workpiece in the through hole so that the workpiece penetrates the through hole, rotate at least one of the cutter ring and the workpiece, and switch movements of the thread whirling tool in an extending direction of the workpiece and a direction intersecting with the extending direction thereof based on a selected predetermined cutting tool.

The machine tool according to the present disclosure may form screws having a plurality of screw grooves having different shapes.

BRIEF DESCRIPTION OF THE DRAWINGS

FIG. 4 is a flowchart of the first screw forming process performed by the machine tool shown in FIG. 1;

FIGS. 6A and 6B are diagrams illustrating the operation of the cutter ring in S106 shown in FIG. 4;

FIG. 7 is a side view of a screw formed by the first screw forming process shown in FIG. 4.

FIG. 8 is a flowchart of a second screw forming process performed by the machine tool shown in FIG. 1;

FIG. 9 is a side view of a screw formed by the second screw forming process shown in FIG. 8;

FIG. 10 is a flowchart of a third screw forming process performed by the machine tool shown in FIG. 1;

FIG. 11 is a side view of a screw formed by the third screw forming process shown in FIG. 10.

FIG. 14 is a side view of a screw formed by a screw forming process according to a modification shown in FIG. 13.

DESCRIPTION

Hereinafter, with reference to the drawings, a mechanical tool, a control method of a machine tool and a control program of a machine tool will be explained. However, the technical scope of the present invention is not limited to those embodiments, but spans the claimed invention and its equivalents.

Figure 1:
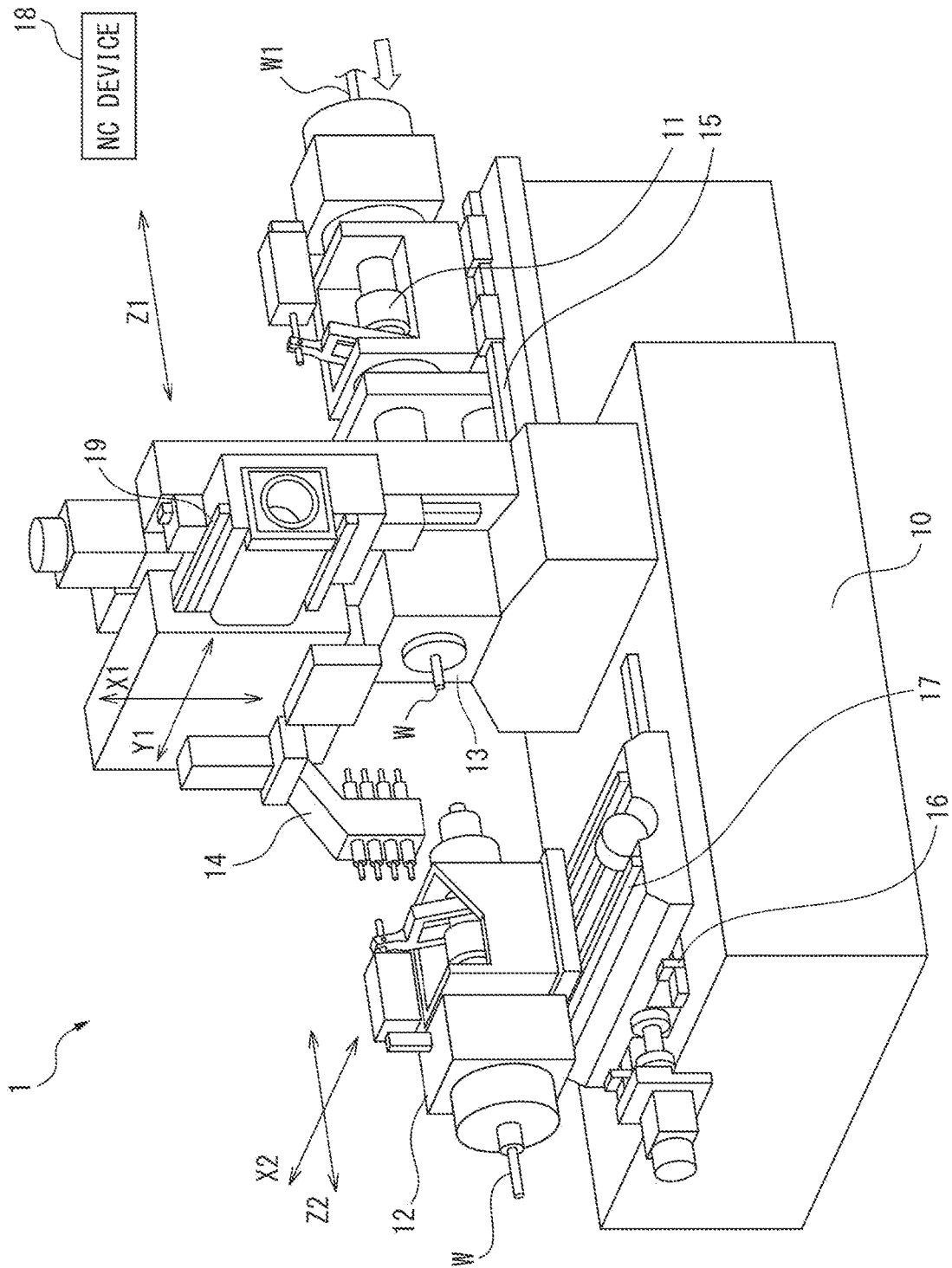
FIG. 1 is a perspective view of a machine tool according to an embodiment.

FIG. 1 is a perspective view of a machine tool according to an embodiment.

A machine tool 1 has a bed 10, a front spindle 11, a rear spindle 12, a guide bushing device 13, a turret 14, and an NC device 18. The front spindle 11, the rear spindle 12, the guide bushing device 13 and the turret 14 are mounted on the bed 10. The front spindle 11 is a hollow-shaped member capable of gripping a cylindrical workpiece W, and may move in the Z1 direction by mounted on a moving mechanism that moves along a rail 15. The rear spindle 12 is a hollow-shaped member capable of gripping a workpiece W having substantially the same diameter as that of the workpiece W, and may move in the Z2 and X2 directions by mounted on a moving mechanism which moves along rails 16 and 17. Rotations and movements of the front spindle 11 and rear spindle 12 are controlled by the NC device 18 that is a controller mounted on the machine tool 1. The guide bushing device 13 holds a workpiece W held in the front spindle 11 for guiding the workpiece W.

Figure 2:
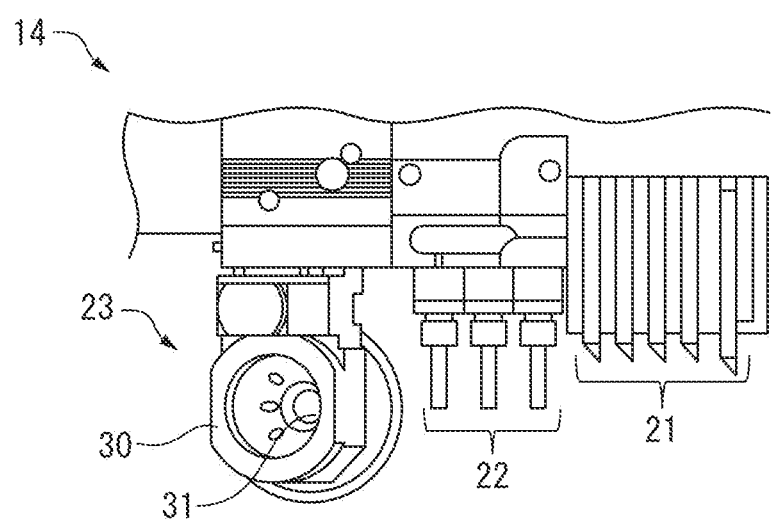
FIG. 2 is a front view showing the turret shown in FIG. 1 in detail.

FIG. 2 is a front view showing the turret 14 in detail.

The turret 14 holds a cutting tool 21 and rotatably holds a rotary tool 22 and a cutter ring 31 of a thread whirling tool 23 having a housing 30 and the cutter ring 31. The housing 30 of the thread whirling tool 23 rotatably holds the cutter ring 31, and houses a rotation transmission mechanism (not shown) that is connected to a rotation mechanism of the turret 14, and rotates the cutter ring 31 when the rotation mechanism of the turret 14 rotates.

The turret 14 moves the held cutting tool 21, the rotary tool 22 and the thread whirling tool 23 in the X1 and Y1 directions by mounted on a moving mechanism for moving along a rail 19, and cuts a workpiece W held by the front spindle, by rotating the rotary tool 22 and the cutter ring 31 of the thread whirling tool 23. Movements of the cutting tool 22, the rotary tool 22 and the thread whirling tool 23, and rotations of the rotary tool 22 and the thread whirling tool 23 are controlled by the NC device 18.

Figure 3B:
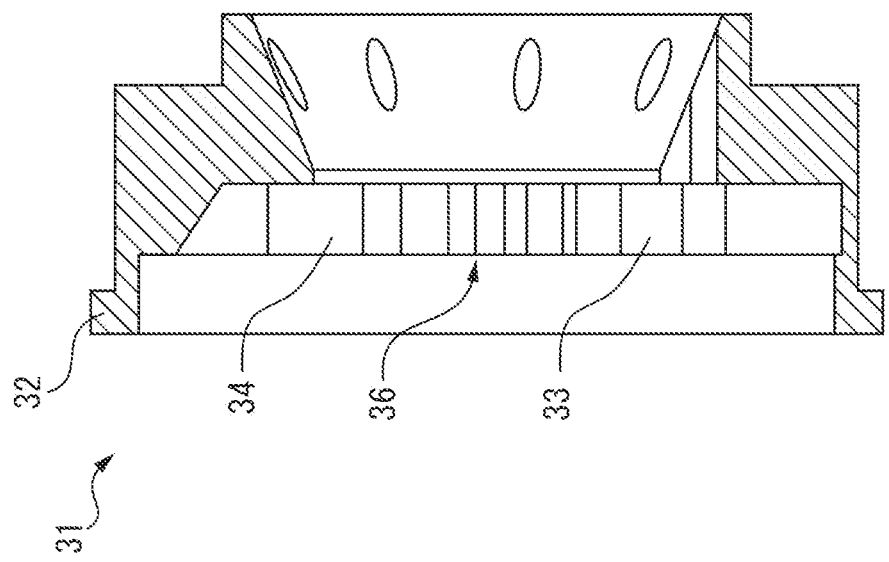
FIG. 3B is a sectional view taken along the line A-A of FIG. 3A.
Figure 3A:
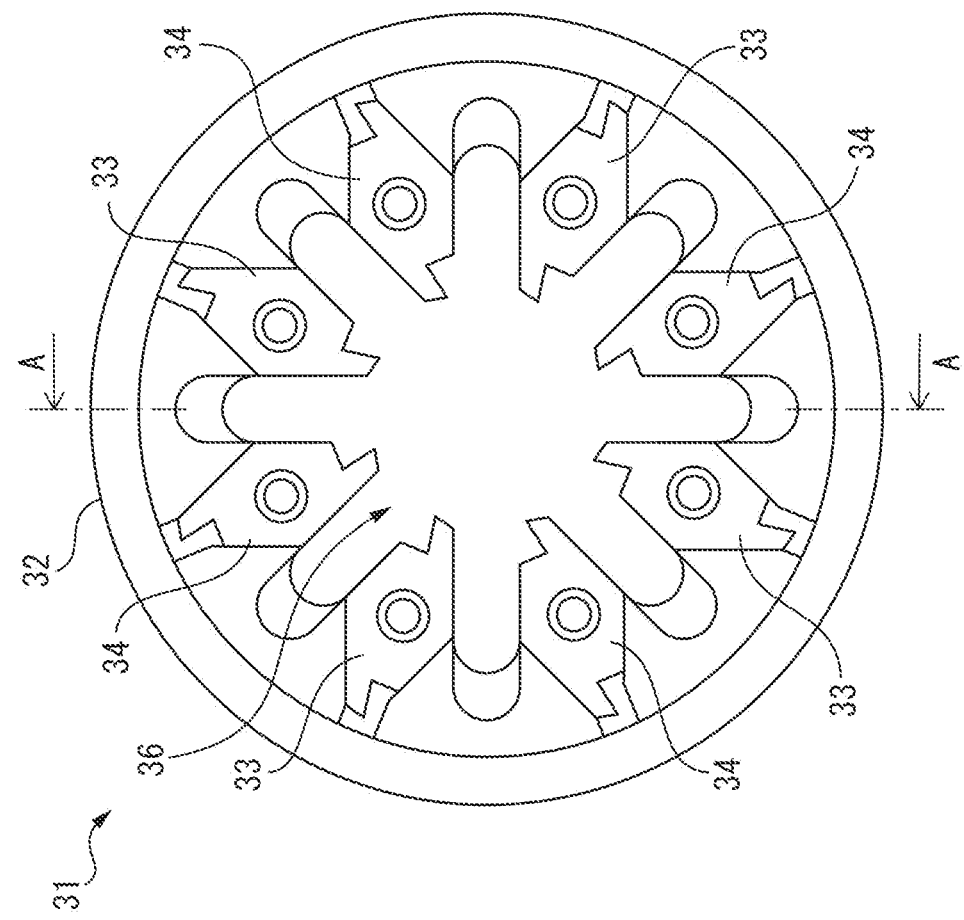
FIG. 3A is a front view of the cutter ring shown in FIG. 2.

FIG. 3A is a front view of the cutter ring 31, and FIG. 3B is a sectional view taken along the line A-A of FIG. 3A.

The cutter ring 31 has a base 32, four first cutting tools 33, and four second cutting tools 34, continuously cutting a workpiece disposed in a through hole 36 formed inside the base 32 when the base 32 is rotated. The base 32 has an annular planar shape, and holds the first cutting tools 33 and the second cutting tools 34 on the inner diameter side thereof.

The four first cutting tools 33 are disposed at equal intervals on the circumference, and form a first screw groove having a first cross-sectional shape on the cylindrical surface of the workpiece W, by cutting the cylindrical surface of the workpiece W held by the front spindle 11. The four second cutting tools 34 are disposed at equal intervals on the circumference, and forms a second screw groove having a second cross-sectional shape on the cylindrical surface of the workpiece W, by cutting the cylindrical surface of the workpiece W held by the front spindle 11. The four first cutting tools 33 and the second cutting tools 34 are disposed alternately at equal intervals on the circumference along the inner wall of the cutter ring 31.

The NC device 18 has a memory for storing a computer program and a processing circuit such as a CPU, and the processing circuit executes processes based on the computer program stored in a storage circuit, thereby causing the machine tool 1 to perform predetermined processing. The computer program may be installed in the storage circuit using a known set-up program from a computer readable non-temporary portable recording medium such as a CD-ROM and DVD-ROM.

Figure 5B:
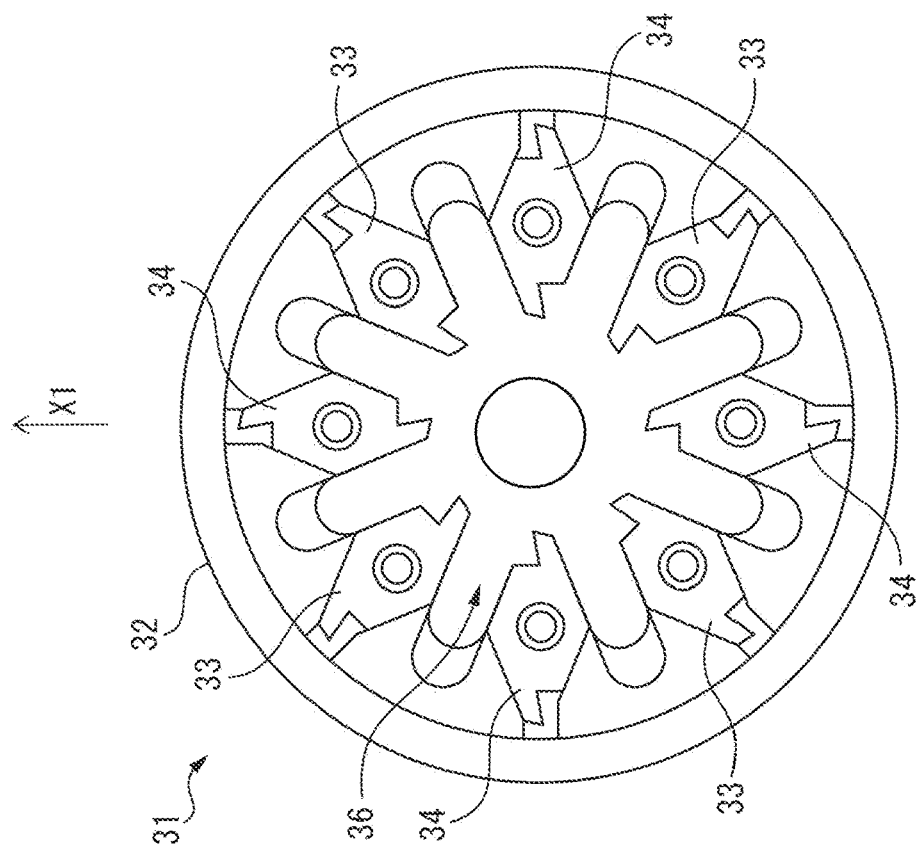
FIGS. 5A and 5B are diagrams illustrating the operation of the cutter ring in S105 shown in FIG. 4.
Figure 5A:
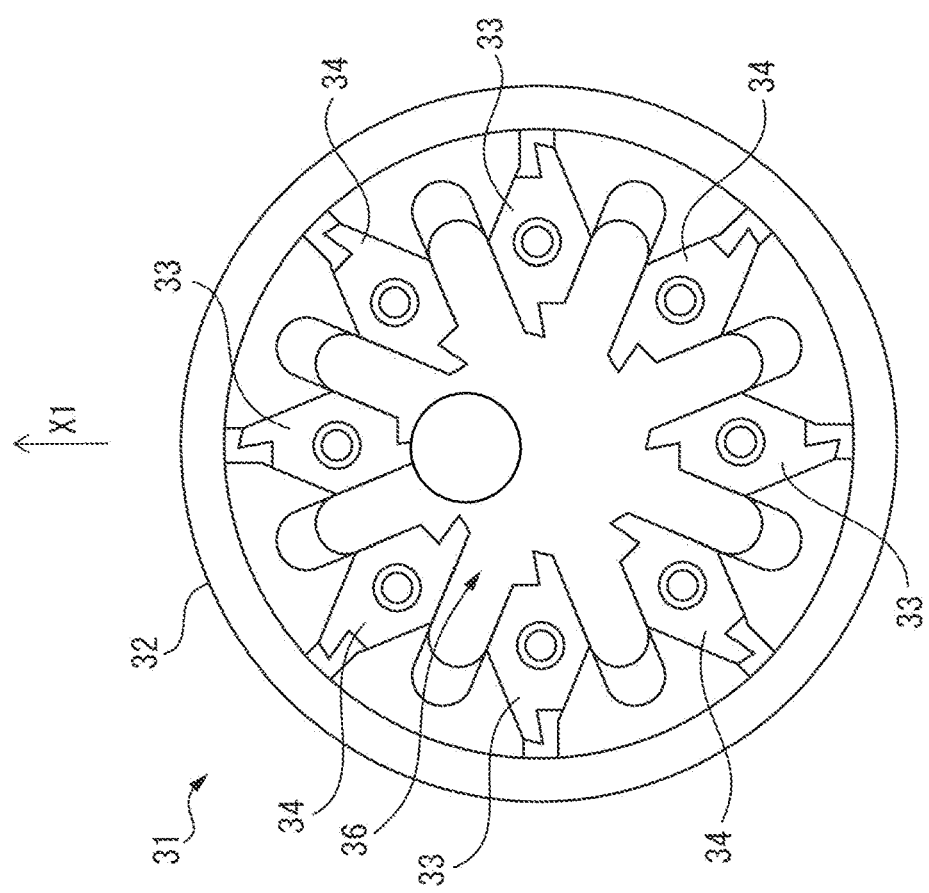

FIG. 4 is a flowchart of the first screw forming process performed by the machine tool 1, FIGS. 5A and 5B are diagrams illustrating the operation of the cutter ring 31 in S105 shown in FIG. 4, and FIGS. 6A and 6B are diagrams illustrating the operation of the cutter ring 31 in S106 shown in FIG. 4. The first screw forming process shown in FIG. 4 is executed by controlling each element of the machine tool 1 via commands from the NC device 18 and in cooperation with each element of the machine tool 1.

First, the NC device 18 has the front spindle 11 hold the workpiece W (S101). Then, the NC device 18 moves the front spindle 11 and the turret 14, for disposing the workpiece W at an initial position at which the workpiece W penetrates the through hole 36 of the cutter ring 31 (S102). Then, the NC device 18 moves the cutter ring 31 of the thread whirling tool 23 and the workpiece W in the Z1 direction which is an extending direction of the workpiece W, while the NC device 18 rotates the cutter ring 31 of the thread whirling tool 23 and the workpiece W (S103).

Then, the NC device 18 moves the thread whirling tool 23 during a first period for forming a first screw groove by cutting the workpiece W by the first cutting tools 33, so that the first cutting tools 33 are in contact with the cylindrical surface of the workpiece W and the second cutting tools 34 are not in contact with the surface thereof (S104). As shown in FIGS. 5A and 5B, the NC device 18 moves the thread whirling tool 23 by moving the turret 14 in the X1 direction intersecting the Z1 which is an extending direction of the workpiece W, so that the first cutting tools 33 are in contact with the workpiece W, and the second cutting tools 34 are not in contact with the workpiece W. The NC device 18 moves the thread whirling tool 23 in the X1 direction, for example, in accordance with the phase of the rotation angle of the cutter ring 31, so that the first cutting tools are in contact with the workpiece W, and the second cutting tools 34 are not in contact with the workpiece W. Further, if the shape of the first screw groove formed by the first cutting tools 33 becomes a desired shape, the workpiece W may be in contact with the second cutting tools 34. Distances of moving the thread whirling tool 23 from a position where the first cutting tools 33 are in contact with the workpiece W and a position where the second cutting tools 34 are spaced from the workpiece W is reduced, by contacting the workpiece W to the second cutting tools 34, when the first screw groove is formed.

Then, the NC device 18 moves the thread whirling tool 23 during a second period for forming a second screw groove by cutting the workpiece W by the second cutting tools 34, so that the second cutting tools 34 are in contact with the cylindrical surface of the workpiece W, and the first cutting tool 33 are not in contact with the workpiece W (S105). As shown in FIGS. 6A and 6B, the NC device 18 moves the thread whirling tool 23, by moving the turret 14 in the X1 direction intersecting the Z1 which is an extending direction of the workpiece W so that the second cutting tools 34 are in contact with the workpiece W, and the first cutting tools 33 are not in contact with the workpiece W. The NC device 18 moves the thread whirling tool 23 in the X1 direction, for example, in accordance with the phase of the rotation angle of the cutter ring 31 so that the second cutting tools 34 are in contact with the workpiece W, and the first cutting tools 33 are not in contact with the workpiece W. Further, when the shape of the second screw groove formed by the second cutting tools 34 becomes a desired shape, the workpiece W may be in contact with the first cutting tools 33. Further, the NC device 18 controls phases of rotation angles of the cutter ring 31 and the displacements in the and X1 direction of the cutter ring 31 so as to gradually change the shape of the boundary region between the first screw groove and the second screw groove, and therefore the shape of the boundary region therebetween may be a smooth.

Then, when the second period is completed, the NC device 18 forms a head of the screw, by using the rotary tool 22 (S106). Then, the NC device 18 cuts the workpiece W, by using the cutting tool 21 (S107), and the forming process of a screw is terminated.

FIG. 7 is a side view of a screw formed by the first screw forming process shown in FIG. 4.

A screw 40 has a first screw groove portion 41, a second screw groove portion 42 which does not overlap the first screw groove portion 41, and a head 43. A first screw groove 44 formed by the first cutting tools 33 is continuously provided in the first screw groove portion 41, and a second screw groove 45 formed by the second cutting tools 34 is continuously provided in the second screw groove portion 42.

FIG. 8 is a flowchart of a second screw forming process performed by the machine tool 1. The second screw forming process shown in FIG. 8 is executed by controlling each element of the machine tool 1 via commands from the NC device 18, and in cooperation with each element of the machine tool 1. Since the processes of S201~S203, S207 and S208 are similar to those of S101~S103, S106 and S107, a detailed description thereof will be omitted.

FIG. 9 is a side view of a screw formed by the second screw forming process shown in FIG. 8.

Next to the process of S203, the NC device 18 moves the thread whirling tool 23 during a first period for forming the first screw groove by the first cutting tools 33 so that the first cutting tools 33 are in contact with the cylindrical surface of the workpiece W, and the second cutting tools 34 are not in contact with the workpiece W (S204). The NC device 18 moves the thread whirling tool 23, by moving the turret 14 in the X1 direction intersecting the Z1 which is an extending direction of the workpiece W so that the first tools 33 are in contact with the workpiece W, and the second cutting tools 34 are not in contact with the workpiece W. In the first period shown in S204, the NC device 18 forms a first screw groove with a first lead having a length twice larger than the width of the first screw groove.

Then, the NC device 18 returns the workpiece W to the initial position (S205). The NC device 18 returns the workpiece W to the initial position, by moving the workpiece W in the X1 and Y1 directions on a planar intersecting an extending direction of the workpiece W, further moving the workpiece W in the Z1 direction which is the extending direction thereof.

Then, the NC device 18 moves the thread whirling tool 23 during a second period for forming the second screw groove by the second cutting tools 34 so that the second cutting tools 34 are in contact with the cylindrical surface of the workpiece W, and the first cutting tools 33 are not in contact the surface thereof (S206). The NC device 18 moves the thread whirling tool 23, by moving the turret 14 in the X1 direction intersecting the Z1 which is an extending direction of the workpiece W, so that the second cutting tools 34 are in contact with the workpiece W, and the first cutting tools 33 are not in contact with the workpiece W. In the second period shown in S206, the NC device 18 moves the front spindle 11 and the turret 14 so that second screw groove 45 having the same width as that of the first screw groove 44 formed in the first period shown in S204 are formed through the first screw groove 44.

A screw 50 has a screw groove portion 51 and a head 53. The first screw groove 44 formed by the first cutting tools 33 and the second screw groove 45 formed by the second cutting tools 34 are alternately continuously provided in the screw groove portion 51.

FIG. 10 is a flowchart of a third screw forming process performed by the machine tool 1. The third screw forming process shown in FIG. 10 is executed by controlling each element of the machine tool 1 via commands from the NC device 18, and in cooperation with each element of the machine tool 1. Since the processes of S301~S303, S309 and S310 are similar to those of S101~S103, S106 and S107, a detailed description thereof will be omitted.

FIG. 11 is a side view of a screw formed by the third screw forming process shown in FIG. 10.

Next to the process of S303, the NC device 18 moves the thread whirling tool 23 during a first period for forming the first screw groove 44 by the first cutting tools 33, so that the first cutting tools 33 are in contact with the cylindrical surface of the workpiece W, and the second cutting tools 34 are not in contact with the cylindrical surface thereof (S304). The NC device 18 moves the thread whirling tool 23, by moving the turret 14 in the X1 direction intersecting the Z1 which is an extending direction of the workpiece W, so that the first cutting tools 33 are in contact with the workpiece W, and the second cutting tools 34 are not in contact with the workpiece W. In the first period shown in S304, the NC device 18 forms a first screw groove with a second lead having a length three times longer than the width of the first screw groove formed in the first period shown in S104.

Then, the NC device 18 returns the workpiece W to the initial position (S305). The NC device 18 returns the workpiece W to the initial position, by moving the workpiece W in the X1 and Y1 directions on a planar intersecting in the drawing direction, further moving the workpiece W in the Z1 direction which is an extending direction of the workpiece W.

Then, the NC device 18 moves the thread whirling tool 23 during a second period for forming the second screw groove 45 by the second cutting tools 34, so that the second cutting tools 34 are in contact with the cylindrical surface of the workpiece W, and the first cutting tools 33 are not in contact with the cylindrical surface thereof (S306). The NC device 18 moves the thread whirling tool 23, by moving the turret 14 in the X1 direction intersecting the Z1 which is an extending direction of the workpiece W, so that the second cutting tools 34 are in contact with the workpiece W, and the first cutting tools 33 are not in contact with the workpiece W. In the second period shown in S306, the NC device 18 moves the front spindle 11 and the turret 14 so that the second screw groove 45 having the same width as that of the first screw groove 44 formed in the first period shown in S304 are contacted with the first screw groove 44. Then, the NC device 18 returns the workpiece W to the initial position (S307). The NC device 18 returns the workpiece W to the initial position, by moving the workpiece W in the X1 and Y1 directions on a planar intersecting an extending direction of the workpiece W, further moving the workpiece W in the Z1 direction which is the extending direction thereof.

Then, the NC device 18 moves the thread whirling tool 23 during a third period for forming again the first screw groove 44 as a third screw groove 44 by the first cutting tools 33, so that the first cutting tools 33 are in contact with the cylindrical surface of the workpiece W, and the second cutting tools 34 are not in contact with the surface thereof (S308). In the third period shown in S308, the NC device 18 moves the front spindle 11 and the turret 14 so that the first screw groove 44 having the same width as that of the first screw groove 44 formed in the first period shown in S304 is formed between the first screw groove 44 and the second screw groove 45.

A screw 60 has a screw groove portion 61 and a head 63. Screw groove groups 47 in which the first screw groove 44, the second screw groove 45 and the first screw groove 44 are continuously provided in the screw grove portion 61, sequentially.

Figure 12:
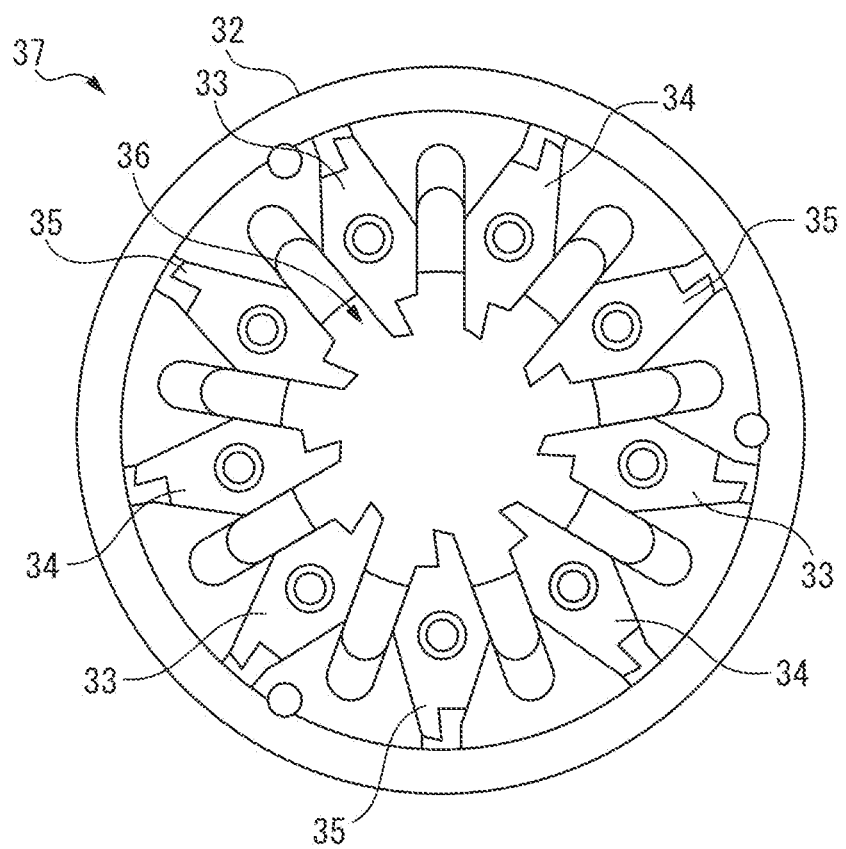
FIG. 12 is a front view of a cutter ring according to a modification.

FIG. 12 is a front view of a cutter ring according to a modification.

A cutter ring 37 is different from the cutter ring 31 in that the cutter ring 37 has three first cutting tools 33, three second cutting tools 34 and three third cutting tools 35 in place of the four first cutting tools 33 and four second cutting tools 34. The three third cutting tools 35 are disposed at equal intervals on the circumference, and form a third screw groove 46 having a deeper cross-sectional shape than that of the first screw groove on the cylindrical surface of the workpiece W, by cutting the cylindrical surface of the workpiece W held by the front spindle 11. Since the elements and functions of the configurations other than the cutter ring 37 of the machine tool according to a modification are the same as those of the machine tool 1 having the same reference numerals, a detailed description thereof will be omitted.

Figure 13:
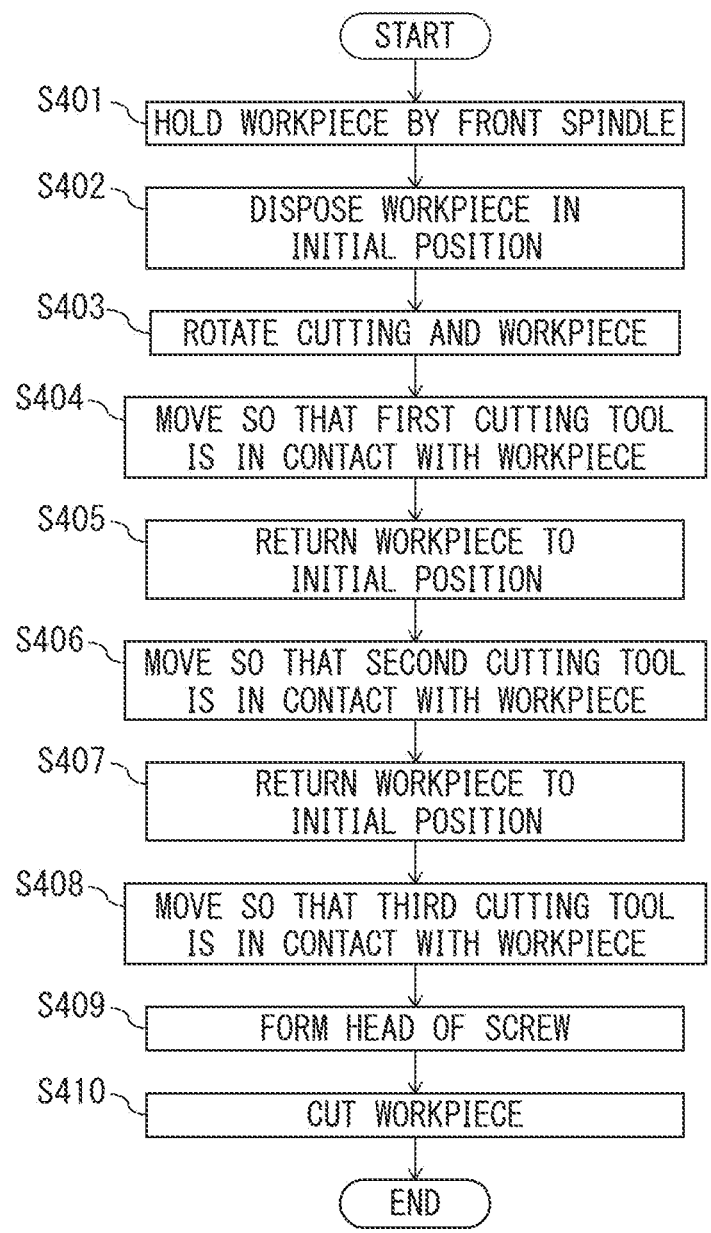
FIG. 13 is a flowchart of a screw forming process according to a first modification performed by the machine tool according to a modification.

FIG. 13 is a flowchart of a screw forming process according to a first modification performed by the machine tool according to a modification. The screw forming process shown in FIG. 13 is executed by controlling each element of the machine tool according to a modification via commands from the NC device 18, and in cooperation with each element of the machine tool according to a modification. Since the processes of S401~S403, S409 and S410 are similar to those of S101~S103, S106 and S107, a detailed description thereof will be omitted.

FIG. 14 is a side view of a screw formed by a screw forming process according to a modification shown in FIG. 13.

Next to the process of S403, the NC device 18 moves the thread whirling tool 23 during a first period for forming the first screw groove 44 by the first cutting tools 33 so that the first cutting tools 33 are in contact with the cylindrical surface of the workpiece W, and the second cutting tools 34 and the third cutting tools 35 are not in contact with the cylindrical surface thereof (S404). The NC device 18 moves the thread whirling tool 23, by moving the turret 14 in the X1 direction intersecting the Z1 which is an extending direction of the workpiece W so that the first cutting tools 33 are in contact with the workpiece W, and the second cutting tools 34 and the third cutting tools 35 are not in contact with the workpiece W. In the first period shown in S404, the NC device 18 forms a first screw groove 44 with a second lead having a length three times longer than the width of the first screw groove 44.

Then, the NC device 18 returns the workpiece W to the initial position (S405). The NC device 18 returns the workpiece W to the initial position, by moving the workpiece W in the X1 and Y1 directions on a planar intersecting the Z1 which is an extending direction of the workpiece W, further moving the workpiece W in the Z1 direction which is an extending direction of the workpiece W.

Then, the NC device 18 moves the thread whirling tool 23 during a second period for forming the second screw groove 45 by the second cutting tools 34 so that the second cutting tools 34 are in contact with the cylindrical surface of the workpiece W, and the first cutting tools 33 and the third cutting tools 35 are not in contact with the cylindrical surface thereof (S406). The NC device 18 moves the thread whirling tool 23, by moving the turret 14 in the X1 direction intersecting the Z1 which is an extending direction of the workpiece W so that the second cutting tools 34 are in contact with the workpiece W, and the first cutting tools 33 and the third cutting tools 35 are not in contact with the workpiece W. In the second period shown in S406, the NC device 18 moves the front spindle 11 and the turret 14 so that the second screw groove 45 having the same width as that of the first screw groove formed in the first period shown in S404 is contacted with the first screw groove 44.

Then, the NC device 18 returns the workpiece W to the initial position (S407). The NC device 18 returns the workpiece W to the initial position, by moving the workpiece W in the X1 and Y1 directions on a planar intersecting the Z1 which is an extending direction of the workpiece, further moving the workpiece W in the Z1 direction which is the extending direction thereof.

Then, the NC device 18 moves the thread whirling tool 23 during a third period for forming the third screw groove 46 by the third cutting tools 35 so that the third cutting tools 35 are in contact with the cylindrical surface of the workpiece W, and the first cutting tools 33 and the second cutting tools 34 are not in contact with the cylindrical surface thereof (S408). The NC device 18 moves the thread whirling tool 23, by moving the turret 14 in the X1 direction intersecting the Z1 which is an extending direction of the workpiece W, so that the third cutting tools 35 are in contact with the workpiece W, and the first cutting tools 33 and the second cutting tools 34 are not in contact with the workpiece W. In the third period shown in S408, the NC device 18 moves the front spindle 11 and the turret 14 so that the third screw groove 46 having the same width as that of the first screw groove 44 formed in the first period shown in S404 is formed between the first screw groove 44 and the second screw groove 45.

A screw 70 has a screw groove portion 71 and a head 73. The first screw groove 44 formed by the first cutting tools 33, the second screw groove 45 formed by the second cutting tools 34 and the third screw groove 46 formed by the third cutting tools 35 and having depth deeper than those of the first screw groove 44 and the second screw groove 45 are alternately continuously provided in the screw groove portion 71.

The machine tool 1 may be easily formed a screw having different screw groove shapes, by using the single thread whirling tool 23, by forming the first screw groove 44 by the first cutting tools 33 in the first period, and forming the second screw groove 45 by the second cutting tools 34 in the second period. Further, the machine tool 1 may be controlled by a relatively simple computer program, for example, a program including movement amount M in the X direction by a sine function of time t (M=α×sin (β×t)), since the first cutting tools 33 and the second cutting tools are disposed alternately at equal intervals on the circumference. Further, since the four first cutting tools and the four second cutting tools 34 are disposed alternately at equal intervals on the circumference, the cutting amount of the four first cutting tools 33 and the four second cutting tools 34 are uniform, and therefore a screw groove forming processed with high accuracy may be easily achieved.

Further, the machine tool 1 may form the screw 40 including the first screw groove portion 41 in which the first screw groove 44 are continuously provided and the second screw groove portion 42 in which the second screw groove 45 are continuously provided, by continuing the first period in which the first screw groove 44 is formed and the second period in which the second screw groove 45 is formed.

Further, the machine tool 1 may form the screw 50 in which the first screw groove 44 and the second screw groove are continuously provided alternately, by forming the second screw groove 45 through the first screw groove 44 formed by the first lead during the first period, during the second period.

Further, the machine tool 1 may form the screw 60 in which the first screw groove 44, the second screw groove 45 and the first screw groove 44 are continuously provided alternately, by forming the first screw groove 44 between the first screw groove 44 and the second screw groove 45 formed by the second lead during the first and the second periods, during the third period.

Further, although, in the machine tool 1, the thread whirling tool 23 has two types of cutting tools having different shapes as the first cutting tools 33 and the second cutting tools 34, in the machine tool according to the embodiment, the thread whirling tool 23 may have three or more different cutting tools having different shapes. If the thread whirling tool 23 has three types of cutting tools having different shapes, the machine tool may form a three-threaded screw disposing alternately screw grooves formed by three or more types of cutting tools in the same manner as the second screw forming process.

Further, a first screw having the first screw groove 44 and having no second screw groove 45, and a second screw having no first screw groove 44 and having the second screw groove 45 may be formed by using the single machine tool 1, without changing the thread whirling tool 23.

Although, in the machine tool 1, the thread whirling tool 23 has the four first cutting tools 33 and the four second cutting tools 34, in the machine tool according to the embodiment, the thread whirling tool 23 may have at least one of the first cutting tools 33 and at least one of the second cutting tools 34. Although, in the machine tool according to the embodiment, in the thread whirling tool 23, a plurality of types of cutting tools are alternately disposed on the circumference along the inner wall of the cutter ring 31, a region where the plurality of first cutting tools 33 are disposed adjacent and a region where the plurality of second cutting tools 34 are disposed may be separately formed. If the region where the plurality of first cutting tools 33 are adjacently disposed and the region where the plurality of second cutting tools 34 are adjacently disposed may be separately formed, the movement process of the cutter ring 31 may be performed once for each rotation, and therefore the load on the drive mechanism is suppressed. The NC device 18 may move the thread whirling tool 23 in accordance with the rotational positions of the first cutting tools 33 and the second cutting tools 34.

Further, although, in the machine tool 1, the cutting process by the thread whirling tool 23 is performed by rotating both the cutter ring 31 and the workpiece W, a machine tool according to the embodiment may perform cutting process by rotating at least one of the cutter ring 31 and the workpiece W.

Further, although, in the third screw forming process, the screw 60 on which the first screw groove 44, the second screw groove 45 and the first screw groove 44 are sequentially continuously provided is formed, in the screw forming process according to the embodiment, a screw on which the first screw groove 44, the second screw groove 45 and the second screw groove 45 are sequentially continuously provided may be formed. Further, in the screw forming process according to the embodiment, a screw on which the second screw groove 45, the first screw groove 44 and the second screw groove 45 are sequentially continuously provided may be formed, and multi-threaded screw having a length of 4 times or more longer than that of the first screw groove 44 may be formed.

What is claimed is:
1. A machine tool comprising:
a spindle rotatably holding a cylindrical workpiece;
a turret holding a thread whirling tool having a cutter ring having a base on which a through hole is formed and a plurality of types of cutting tools disposed on the inner diameter side of the base, the plurality of types of cutting tools including a first cutting tool for forming a first screw groove by cutting the workpiece, and a second cutting tool having a shape different from that of the first cutting tool for forming a second screw groove by cutting the workpiece, so as to rotatably hold the cutter ring;

a controller controlling rotations and relative movements of the spindle and the turret, wherein the controller has the spindle hold the workpiece, disposes the workpiece in the through hole so that the workpiece penetrates the through hole, rotates at least one of the cutter ring and the workpiece, and switches movements of the thread whirling tool in an extending direction of the workpiece and a direction intersecting with the extending direction thereof, depending on whether the first cutting tool is forming the first screw groove or the second cutting tool is forming the screw groove.

2. The machine tool according to claim 1, wherein the controller forms the first screw groove in a first screw portion during the first period, and forms the second screw groove in a second screw portion which does not overlap the first screw groove portion during the second period.

3. The machine tool according to claim 1, wherein the controller forms the first screw groove with a first lead having a length twice larger than the width of the first screw groove, and form the second screw groove through the first screw groove during the second period.

4. The machine tool according to claim 1, wherein the controller forms the first screw groove with a second lead having a length three times larger than the width of the first screw groove during the first period, forms the second screw groove so that one end thereof is contacted with the first screw groove during the second period, and forms a third screw groove between the first screw groove and the second screw groove during a third period for forming the third screw groove by cutting the workpiece by the first cutting tool or the second cutting tool, by moving the thread whirling tool in the direction crossing the extending direction of the workpiece to, so that the first cutting tool or the second cutting tool are in contact with the workpiece.

5. The machine tool according to claim 1, wherein the cutting tools further include a third cutting tool having a shape different from that of the first cutting tool and a second cutting tool, and the controller forms the first screw groove with a second lead having a length three times larger than the width of the first screw groove during the first period, forms the second screw groove so that one end thereof is contacted with the first screw groove during the second period, and forms a third screw groove between the first screw groove and the second screw groove during the third period for forming the third screw groove by cutting the workpiece by the third cutting tool, by moving the thread whirling tool in a direction crossing the extending direction of the workpiece during the third period for forming the third screw groove by cutting the workpiece by the third cutting tool, so that the third cutting tool are in contact with the workpiece.

6. The machine tool according to claim 1, wherein the controller moves the thread whirling tool in a direction crossing the extending direction of the workpiece during a first period for forming the first screw groove by cutting the workpiece by the first cutting tool, so that the first cutting stool is in contact with the workpiece, and moves the thread whirling tool in the direction crossing the extending direction of the workpiece during a second period for forming a second screw groove by cutting a workpiece by a second cutting tool, so that the second cutting stool is in contact with the workpiece.

7. A method for controlling a machine tool comprising:

a spindle rotatably holding a cylindrical workpiece;

a turret holding a thread whirling tool having a cutter ring having a base on which a through hole is formed and a plurality of types of cutting tools disposed on the inner diameter side of the base, the plurality of types of cutting tools including a first cutting tool for forming a first screw groove by cutting the workpiece, and a second cutting tool having a shape different from that of the first cutting tools for forming a second screw groove by cutting a workpiece, so as to rotatably hold the cutter ring;

a controller controlling rotations and relative movements of the spindle and the turret, wherein the controller executes a process to have the spindle hold the workpiece, disposes the workpiece in the through hole so that the workpiece penetrates the through hole, rotate at least one of the cutter ring and the workpiece, and switches movements of the thread whirling tool in an extending direction of the workpiece and a direction intersecting with the extending direction thereof, depending on whether the first cutting tool is forming the first screw groove or the second cutting tool is forming the screw groove.

8. A computer readable non-temporary recording medium having stored therein a computer program for controlling a machine tool comprising:

a spindle rotatably holding a cylindrical workpiece;

a turret holding a thread whirling tool having a cutter ring having a base on which a through hole is formed and a plurality of types of cutting tools disposed on the inner diameter side of the base, the plurality of types of cutting tools including a first cutting tool for forming a first screw groove by cutting the workpiece, and a second cutting tool having a shape different from that of the first cutting tools for forming a second screw groove by cutting the workpiece, so as to rotatably hold the cutter ring;

a controller controlling rotations and relative movements of the spindle and the turret, wherein the controller executes a process to have the spindle hold the workpiece, disposes the workpiece in the through hole so that the workpiece penetrates the through hole, rotate at least one of the cutter ring and the workpiece, and switches movements of the thread whirling tool in an extending direction of the workpiece and a direction intersecting with the extending direction thereof, depending on whether the first cutting tool is forming the first screw groove or the second cutting tool is forming the screw groove.

\* \* \* \* \*